Dec. 22, 1959   C. R. POLLEY   2,918,037
CHAIN TYPE AUTOMATIC POULTRY FEEDER
Filed Oct. 16, 1956   4 Sheets-Sheet 1
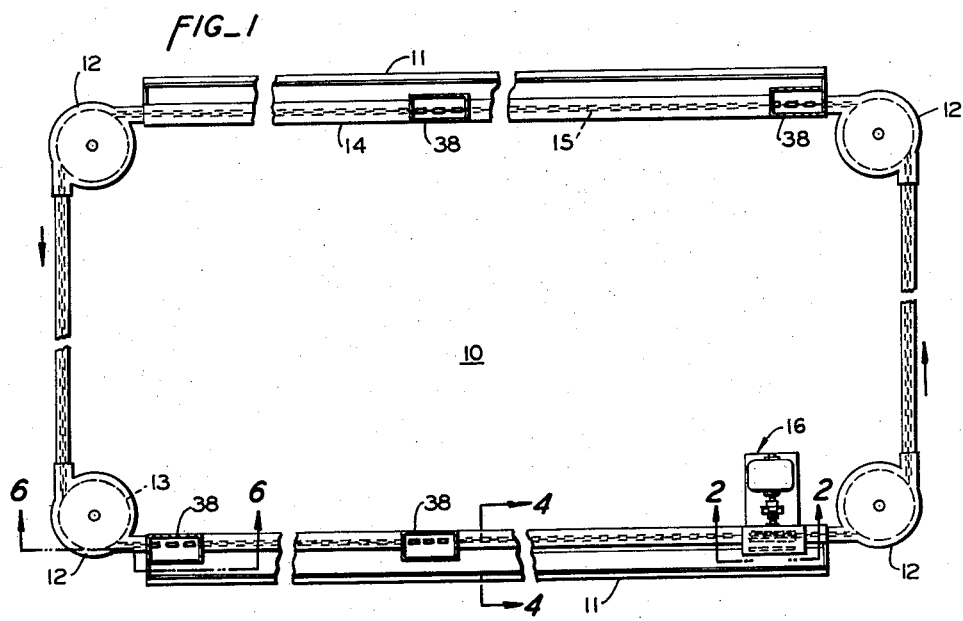
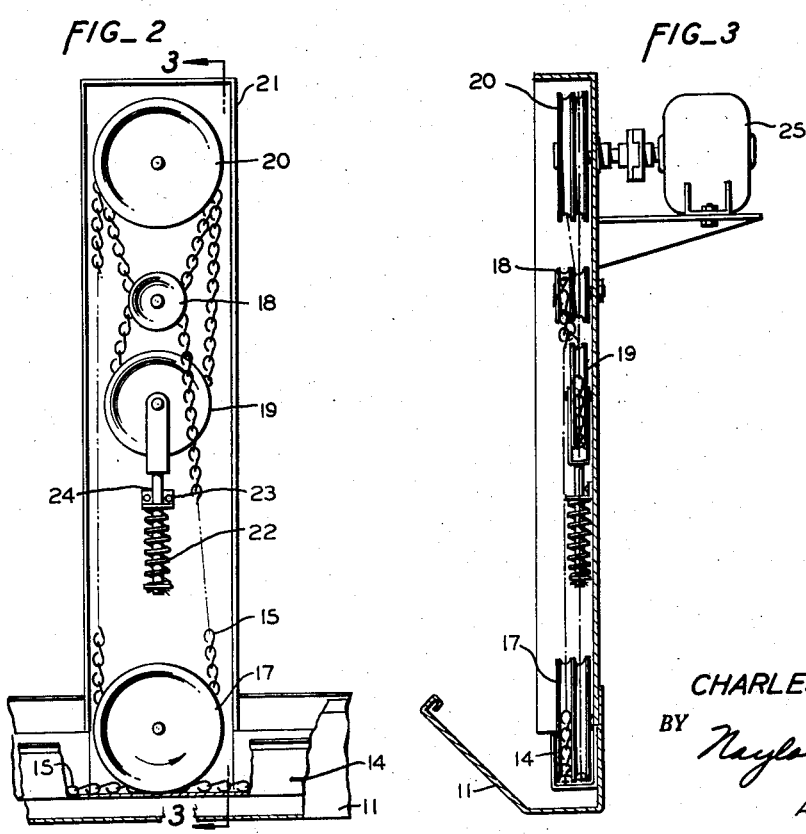
INVENTOR.
CHARLES R. POLLEY
BY Naylor & Neal
ATTORNEYS

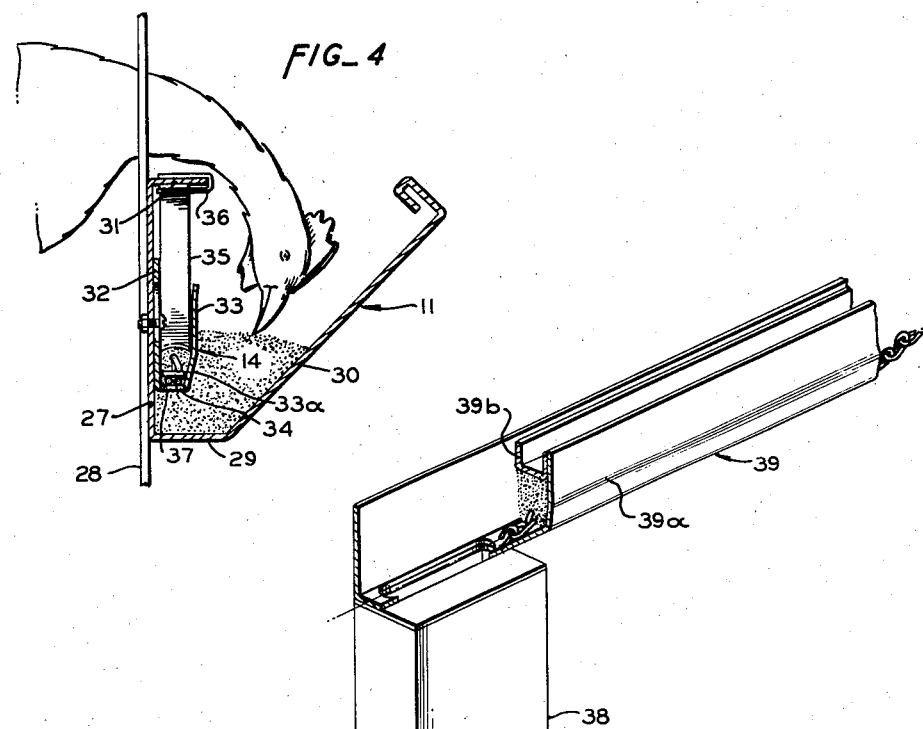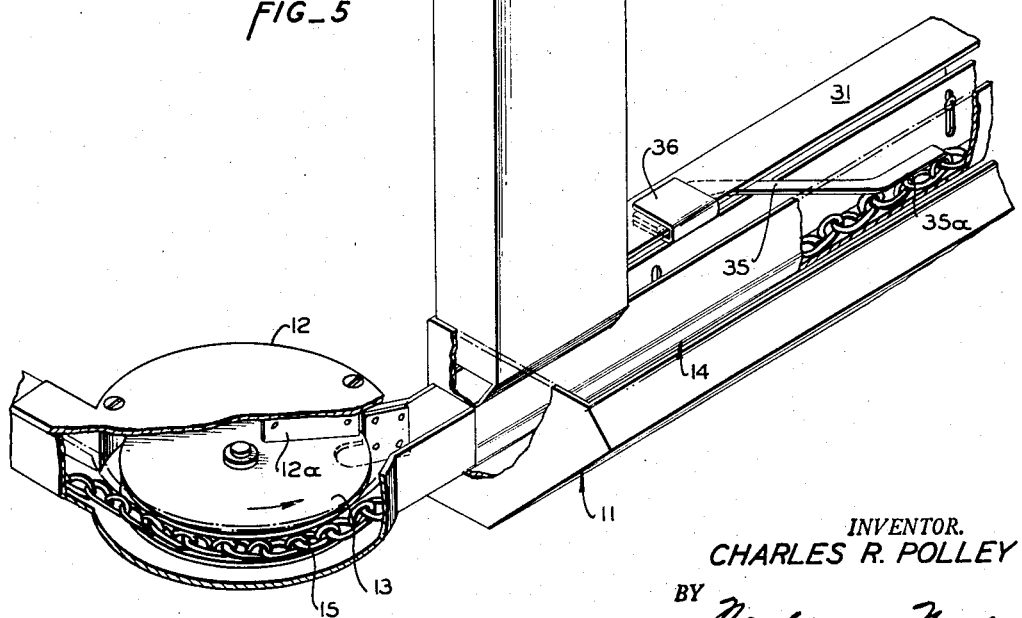

Dec. 22, 1959     C. R. POLLEY     2,918,037
CHAIN TYPE AUTOMATIC POULTRY FEEDER
Filed Oct. 16, 1956     4 Sheets-Sheet 3
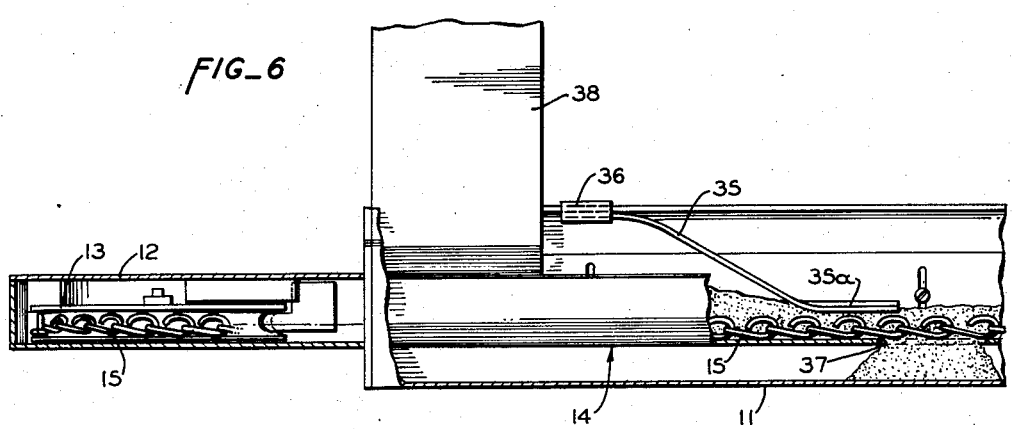
FIG_6
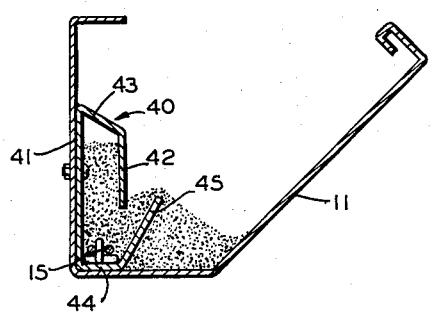
FIG_7
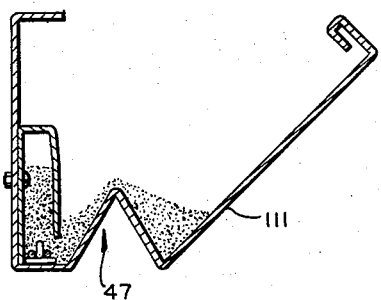
FIG_8
INVENTOR.
CHARLES R. POLLEY
BY
ATTORNEYS Dec. 22, 1959     C. R. POLLEY     2,918,037
CHAIN TYPE AUTOMATIC POULTRY FEEDER
Filed Oct. 16, 1956     4 Sheets-Sheet 4
FIG_9
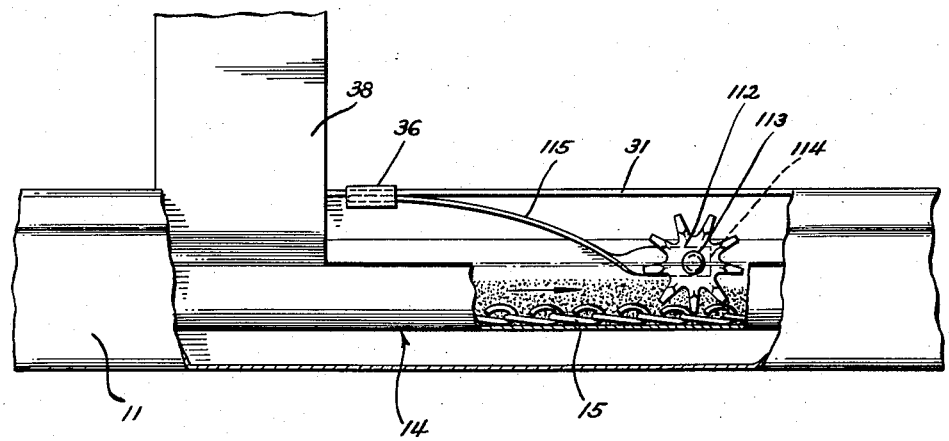
FIG_10
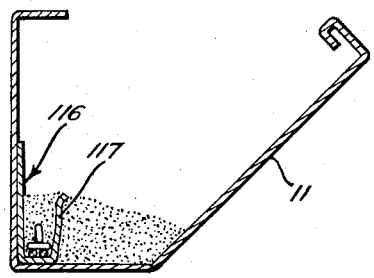
INVENTOR.
CHARLES R. POLLEY
BY
ATTORNEYS

United States Patent Office 2,918,037
Patented Dec. 22, 1959

2,918,037

CHAIN TYPE AUTOMATIC POULTRY FEEDER

Charles R. Polley, Sebastopol, Calif.

Application October 16, 1956, Serial No. 616,321

12 Claims. (Cl. 119—52)

This invention relates to improvements in automatic poultry feeders, and more particularly relates to automatic poultry feeders which regulate distribution of feed to poultry.

Distribution of feed to poultry is desirably accomplished by the automatic regulation of the distribution of the feed in equal amounts and kind to the poultry. Feeds for poultry generally contain a mixture of grain, mash, pellets, and other types of ingredients. Poultry, preferring some of the ingredients, such as grain, to the others in the mixture, will search for and select the preferred ingredients. In so doing, the poultry will make strokes with their beaks, commonly called pecking, for selecting more of the desired ingredients and throwing away or discarding the other ingredients. If an over supply of feed is available to the poultry, then more of the choice ingredients will be eaten to the exclusion of the other ingredients. Also, if one supply of feed is available to several of the poultry, the first to partake of the feed will have more of the choice ingredients than the late comers. An automatic device for feeding poultry should therefore distribute feed evenly in amount and kind to all of the poultry. Since such distribution should preferably be accomplished economically and with as little care and attention as possible, the apparatus for distributing the feed should be an automatic device which is inexpensive in construction and operation.

Several devices of the prior art attempt to regulate the distribution of feed to poultry, but these devices have expensive and complicated structures, operate inefficiently, or fail to automatically regulate distribution of feed in both amount and kind.

The present invention provides for an automatic poultry feeder which has the aforementioned desirable characteristics and comprises a feed distributor member connected within a trough to form two essentially vertical walls and a feed carrier supporting surface, a feed carrier, and pressure means to compress the feed carried by the feed carrier. The feed distributor member has one or more openings to allow feed to be evenly distributed to a portion of the trough for access thereto by poultry. The amount of feed may be regulated by the positioning of the feed distributor member within the trough.

It is, therefore, an object of this invention to provide an automatic poultry feeder which can be economically constructed and operated.

A further object of this invention is to provide an automatic poultry feeder which regulates the distribution of feed to poultry and which prevents poultry from wasting the distributed feed.

Another object of this invention is to provide an automatic poultry feeder which is light in weight and which can be mounted and operated within feed troughs presently in common use.

It is also an object of this invention to provide an automatic poultry feeder in which feed for poultry is carried and not dragged by a distribution member.

Still another object of this invention is to provide an automatic poultry feeder in which feed for poultry is compressed for efficient regulated distribution thereof.

The novel features which are believed to be characteristic of the invention, both as to its organization and method of operation, together with further objects and advantages thereof, will be better understood from the following description considered in connection with the accompanying drawings in which several variations of the invention are illustrated by way of examples. It is to be expressly understood, however, that the drawings are for the purpose of illustration and description only, and are not intended as a definition of the limits of the invention.

Figure 1 is a plan view of a poultry feed conveyor system utilizing this invention.

Figure 2 is a view along lines 2—2 of Figure 1.

Figure 3 is a view along lines 3—3 of Figure 2.

Figure 4 shows in section a side view of the trough and feed distributor member of this invention.

Figure 5 shows a perspective view partly in section of a portion or a poultry feed conveyor system utilizing this invention.

Figure 6 shows a front view partly in section of the portion of the poultry feed conveyor system shown in Figure 5.

Figure 7 shows a cross-sectional view of another feed distribution member to be used with the conveyor system utilizing this invention.

Figure 8 shows a cross-sectional view of still another feed distribution member to be used with the conveyor system utilizing this invention.

Figure 9 is a partly broken away view in front elevation showing another form of chain hold down means.

Figure 10 is a cross-sectional view of a further feed distribution member adapted to be used in the subject conveyor system.

Referring now more particularly to the drawings, there is shown in Figure 1 a plan view of a poultry feed conveyor system utilizing this invention. A central area 10 indicates the place where cages containing poultry (not shown) are positioned next to elongated trough sections 11 so that poultry in the cages will have access to feed in said trough sections. Connected between pulley sheathings 12 having pulleys 13 disposed therein are four sections of feed distributor members 14 which form a continuous feed distributor member system for supplying feed to the trough sections 11. An endless chain 15 slidably moves within the feed distributor member sections, said chain 15 travelling around the pulleys 13. At any convenient position in the endless feed distributor member is positioned a driver system 16 for driving chain 15. In the appended claims, that portion of the trough 11 in which feed is accessible to the poultry is called the feed access channel, that portion of the feed distributor member in which feed is carried for distribution is called the feed distributor conduit, and the conveyor element of the feed distributor member is called a carrier or chain.

Figures 2 and 3 illustrate the construction of driver systems 16. Chain 15 moves from the left, as seen in Figure 2, and travels as follows: under and around the outside groove of first pulley 17, then on top of and around outer groove of idler pulley 18, then under and around pressure pulley 19, then over and around inner groove of second pulley 20, then under and around inner groove of pulley 18, then over and around outer groove of second pulley 20, and finally under and around the inner groove of first pulley 17 to continue along the feed distributor member. First pulley 17 and idler pulley 18 are rotatably journalled by respective shafts connected to housing 21. A spring 22 is fixedly connected at one end to bracket 23 and is supported at its other end by retainer means carried on rod 24 which is connected to a clevis, the ends of which are connected to the axle of pressure pulley 19 to allow free rotation of said pressure pulley. The driver pulley 20 has a shaft directly connected to and driven by electric motor 25 supported by bracket 26.

Spring 22 urges pressure pulley 19 downwardly to take up any slack in chain 15 and to force chain 15 to be driven by second pulley 20 in order to drive all the other pulleys shown in the figures. Accordingly, electric motor 25 can continuously drive chain 15 around pulleys 13 and along the sections of feed distributor member 14.

The driver system described, including the chain 15, is a low power system, the operation of which can be stopped by merely manually gripping the chain. This makes it important that the feed channels 14 be so formed as to prevent any jamming of the grain therein, as this would stall the conveyor system. On the other hand, the low power system employed makes it possible to utilize light weight channels 14 and thin gauge troughs 11, as there is no need to employ heavy duty supports for the conveyor system. This, in turn, enables those ranchers whose cages are not built of heavy enough construction to support conventional feeders to have automatic feeders.

Referring now to Figure 4, trough 11 has a first side 27 vertically aligned with cage 28, a bottom 29, and an angularly inclined second side 30. Side 27 is provided with a flange 31 to prevent access by poultry to the feed distributor member 14. Wall 32 of feed distributor member, or channel, 14 is secured to side 27 of trough 11 by bolts or the like. Wall 33 of member 14 is joined to wall 32 by an horizontal portion 34 which is integral with said walls and which serves as the feed carrier supporting surface. Wall 33 of the feed distributor member has a sloping portion 33a adapted to prevent contact with chain 15 by spring arm 35, one end of which is secured to flange 31 by a U-shaped clamp 36. Feed carrier supporting surface 34 has selectively spaced apertures 37 along the length of the elongated feed distributor member 14 to allow feed to fall through the apertures into the trough sections 11. Wall 32 extends higher than wall 33, but each of said walls has a height dimension equal to a plurality of times the horizontal distance between said walls.

Referring now to Figures 5 and 6, feed distributor member 14 is secured to the trough sections 11 by bolts which extend through vertical slots formed in the wall 32 of said distributor member, said slots enabling positional adjustment of said distributor member with respect to the bottom 29 of trough 11. A standpipe 38 is vertically supported to allow feed to gravitationally move therefrom into distributor member 14.

Pulleys 13 are contained within housings 12 and connected thereto to freely rotate. Accordingly the chain 15 will rotate the pulleys while moving from one section of the feed distributor member to another. Between the top of pulley 13 and the upper inner surface of housing 12 is a vertical plate 12a which is connected to said upper portion of housing. Positioned at the chain outlet side of housing 12 is a plate member having a finger portion 12c which protrudes within the chain groove of pulley 13. Plate 12a and finger 12c prevent feed from being carried around by the pulley to become packed within the housing. Such packing will prevent operation of the conveyor system. As previously indicated, it is important that no jamming or undue packing of the grain take place anywhere in the system due to the low power and light weight characteristics of the subject conveyor and distribution system. In this connection, it is to be pointed out that bevelled portion 33a of feed channels 14 serves another important function, that of permitting the chain 15 to be cammed upwardly thereon to prevent itself from being jammed to a stop by roughage pebbles contained in the grain.

Plate 12a and finger 12c are made flexible so that they will bend if any object in the feed is caught between them and the pulley 13, and snap back into position when the object has passed.

The standpipe 38, a number of which are employed in the feed distribution system, is filled with feed by an automatic supply system 39, such as shown in Figure 5, which comprises a channel in which feed is conveyed by a chain. Spring arm 35 is provided with a horizontally disposed lower end 35a adapted to compress the feed on chain 15 and thereby cause the feed to be moved by the chain with a high degree of efficiency.

Considering now the operation of the poultry feed system, electric motor 25 causes chain 15 to slide along the chain supporting surface 34 of the sections of the feed distributor member 14. Stored feed in standpipes 38 travels downwardly to fill the feed distributor conduit of feed distributor member 14. As the feed is carried away by chain 15, the ends 35a of spring arms 35 compress the feed to promote the efficiency of movement of the feed by the chain and to maintain the chain at the bottom of the channels 14. Feed passes through the chain 15 and the openings 37 of members 14 into the troughs 11. If the height of the feed in the trough beneath the aperture 37 reaches the apertures, flow therethrough will be stopped. Accordingly, vertical adjustment of feed distributor members 14 with respect to the bottoms of troughs 11 will determine the amount of feed supplied to the troughs.

When the poultry peck and search for the choicer feed ingredients, rejected feed is thrown and moved toward the poultry in the direction of feed distributor member 14. Trough flange 31 prevents said feed from entering cages 28 and passing through the perforate bottoms thereof to be lost. Flange 31 will cause the rejected feed to be either received by feed distributor member 14 for redistribution or to be retained in the trough 11.

Referring now to Figure 7, there is shown a cross-sectional view of another feed distributor member, or channel, 40 which is adapted to be used with the conveyor system utilizing this invention. Feed distributor member 40 comprises two spaced walls 41 and 42 having integral therewith an upper wall 43. Wall 43 is provided with a downward slope in order to allow feed thrown thereon by the said pecking action of poultry to slide off. Wall 41 is connected to trough 11 in a manner similar to that previously described. The chain supporting wall 44 is integral with wall 41 and with feed control plate 45 which extends outwardly and upwardly. Feed will move from feed distributor member 40 over the edge of feed control plate 45 to the trough 11. When the feed within the trough builds up to the point where it covers the opening between channel walls 42 and 45, further flow of feed from the channel is inhibited.

Referring now to Figure 8, there is shown a cross-sectional view of still another feed distributor member to be used with the conveyor system utilizing this invention. Trough 111 is shaped to have an inverted V-portion 47 to perform the same function as feed control plate 45 of Figure 7. Feed channel 48 corresponds to feed channel 14 of the preferred embodiment, except that it is disposed in inverted position.

The embodiment of Figures 7 and 8, while they may be used as alternate arrangements for the preferred embodiment, are specially adapted for use in cases where the feed trough present before the conveyor system installation is made is too small to accommodate the preferred channel arrangement, or in cases in which it is not desirable to drop feed through openings in the bottom of the channel, e.g. where a colony of hens are kept in one cage. It is then desirable to have a uniform distribution of feed along the feed trough rather than individual rations adjusted for individual cages by dropping the feed through holes in the bottom of the channel.

When an overall cage system is comprised of both colony-type cages and individual cages, the systems of Figures 7 and 8 may be disposed in relation to the colony cages and in attached relation to the preferred feed channel arrangement, with but one conveyor chain employed for such a composite channel system.

With respect to the embodiments of Figures 7 and 8, it is to be understood that the pecking action of the hens will throw some of the feed within the trough proper back into the channel for redistribution. Also, as is the case with the preferred embodiment of Figure 4, the feed channels of Figures 7 and 8 may be vertically adjusted to control the amount of feed which is disposed within the feed trough and acceptable to the hens.

The overhead automatic supply system 39 of Figure 5 shows another means for maintaining the grain under a degree of pressure which enhances the efficiency of movement of the grain by the chain, said means comprising a channel member 39b which is telescoped within conveyor channel 39a and which may move upwardly and downwardly therein under the action of the grain to compact the same. Channel member 39b may of course be disposed within channel 39a in inverted position. Such grain compacting means may be employed in locations in the systems where there is no necessity to have an open top channel so that the hens can beak the grain back into the channel for re-distribution.

Another form of chain hold down means is shown in Figure 9, said means consisting of a multi-spoke wheel 112 rotatably disposed on pin 113 carried by end 114 of spring arm 115. Arm 115 is secured to trough flange 31 by U-shaped clamp 36. The spokes of wheel 112 mesh with chain 15 and the wheel is rotated by movement of the chain. The spokes of wheel 112 extend downwardly through the relatively loose feed disposed above the chain and press the chain downwardly against the feed beneath the chain. The feed beneath the chain is thereby compressed so that it will move with the chain. The feed above the chain is left relatively loose by the action of wheel 112 and this feed rides along upon the compressed mass of feed at the bottom of the channel. Wheels 112 are desirably employed at the beginning of the feeder line where there is more feed flowing. The spring arms 35 previously described are satisfactory for the purposes mentioned elsewhere in the feeder system.

In the modified form of feeder line shown in Figure 10, the feed conveying channel member 116 is disposed against the bottom of trough 11. The outer wall 117 of channel member 116 is of a lesser height than the outer wall 33 of the preferred channel member 14. Hens eat from the feed while it is moving along the channel member. The rate of travel of the feed is sufficiently high so that the hens have no time to select the preferred constituents of the feed. The narrowness of the channel member prevents the hens from digging down into it very far. Some of the moving feed is billed over wall 117 to form a reserve supply of stationary feed in trough 11. The excess of such reserve supply is billed back into the channel member as the hens search for the preferred feed constituents.

The feed channel arrangement of Figure 10 may be disposed at any point in the overall feeder line that requires it, i.e. where the hen houses are very long and where a large number of hens is kept in a cage, or colony, or upon litter. In such situations, the matter of over-feeding to the point where the hens bill the feed out and cause it to be wasted becomes a real problem. The feed channel of Figure 10 is of the overflow type and serves as an effective trap for excess feed. Slots may be cut in the overflow lip of wall 117 to cause more feed to be delivered into trough 11 at locations where a great many hens eat.

The subject feeder system is not limited to use with a battery type cage system. It may be used in conventional hen houses wherein hens are kept on a litter of straw, peat moss, shavings, or other material. In such cases, the trough in which the feed conveying channel is mounted may be supported above floor level by suitable support brackets.

Various other alterations and changes may be made in size, form, and arrangement of the details of the described automatic poultry feeder without departing from the scope of the appended claims.

This application is a continuation in part of my co-pending application, Serial No. 443,481 filed July 15, 1954, now abandoned.

What is claimed is:

1. A conveyor system for distributing feed to poultry housed within cages, said system comprising: an elongated trough having a first side wall disposed adjacent said cages, a second side wall, and a bottom wall to form a feed access channel; a feed distributor member within the trough below the upper end of said first side wall and connected to said first side wall thereof to form a feed distributor conduit having two spaced vertical walls and a bottom wall constituting a carrier supporting surface, said feed distributor conduit having a plurality of spaced openings therein communicating with the feed access channel and enabling the flow of feed into said feed access channel, said conduit having an elongated opening extending substantially the full length thereof, said elongated opening being disposed above said spaced openings and positioned to enable feed to be returned downwardly into said conduit; a carrier slidably movable along said carrier supporting surface to carry thereon feed to be distributed from between the two spaced walls of the feed distributor conduit to the feed access channel; and pressure means connected to said feed distributor member operable to compress the feed carried by the carrier, said trough and feed distributor conduit or member being so positionally related to each other and to said cages that said distributor conduit or member is disposed below the necks and inwardly of the heads of said poultry as they protrude their heads and necks through said cages to obtain feed from said trough.

2. The conveyor system of claim 1 wherein said feed distributor member is adjustably connected to said first side wall of the trough for varying the distance between the bottom wall of the trough and the bottom wall of said feed distributor member.

3. The conveyor system of claim 1 which further includes a flange extending outwardly from the upper end of the first side wall of said trough into overlying spaced relation with said feed distributor member, said flange being adapted to prevent direct access by poultry to feed in the feed distributor member.

4. The conveyor system of claim 3 wherein said feed distributor member is adjustably connected to said first side wall of the trough for varying the distance between the bottom wall of the trough and the bottom wall of the feed distributor member.

5. A conveyor system for distributing feed to poultry housed within cages, said system comprising: an elongated trough having a first side wall disposed adjacent said cages, a second side wall, and a bottom wall to form a feed access channel; a feed distributor member within the trough adjustably connected to said first side wall thereof to form a feed distributor conduit having two spaced vertical walls and a bottom wall constituting a carrier supporting surface, said feed distributor conduit having a plurality of spaced openings in the bottom thereof communicating with the feed access channel, said conduit having an elongated opening extending substantially the full length thereof, said elongated opening being disposed above said spaced openings and positioned to enable feed to be returned downwardly into said conduit; a flange extending from the first side wall of said trough into overlying spaced relation with said feed distributor member, said flange being adapted to prevent direct access by poultry to feed in the feed distributor member and to prevent poultry from moving feed out of the trough; means to supply feed to the feed distributor conduit: a feed carrier slidably movable along said carrier supporting surface to carry thereon feed to be distributed from between the two spaced walls of the feed distributor conduit to the feed access channel; means to move said feed carrier along said carrier supporting surface; and pressure means to compress the feed carried by the feed carrier, said trough and feed distributor conduit or member being so positionally related to each other and to said cages that said distributor conduit or member is disposed below the necks and inwardly of the heads of said poultry as they protrude their heads and necks through said cages to obtain feed from said trough.

6. Apparatus for distributing feed to poultry housed within cages, said apparatus comprising: an elongated trough having a first side disposed adjacent said cages, a second side, and a bottom to form a feed access channel; a feed distributor member within the trough, said feed distributor member including a first vertical wall, a second vertical wall, and a carrier supporting bottom wall forming a feed distributor conduit, said first vertical wall being connected to the first side of the trough, said conduit having spaced feed dispensing apertures therethrough, said conduit having an elongated opening extending substantially the full length thereof, said elongated opening being disposed above said spaced apertures and positioned to enable feed to be returned downwardly into said conduit; a carrier slidably movable within said conduit along said carrier supporting wall to carry thereon feed to be distributed from between the two walls of the feed distributor conduit through said apertures to the feed access channel; and pressure means to compress the feed carried by the carrier to promote movement of the feed with the carrier in the feed distributor conduit, said trough and feed distributor conduit or member being so positionally related to each other and to said cages that said distributor conduit or member is disposed below the necks and inwardly of the heads of said poultry as they protrude their heads and necks through said cages to obtain feed from said trough.

7. Apparatus according to claim 6 further including means adapted to inhibit direct access by poultry to feed within the feed distributor conduit while being adapted to permit feed to be thrown back into said conduit from said feed access channel by said poultry.

8. A conveyor system for distributing feed to poultry housed within cages comprising a feed trough positioned adjacent the bottom and the front of a row of said cages, said trough having a vertically disposed rearward wall, a horizontally disposed channel secured to said rearward wall and extending therealong, said channel being substantially U-shaped in cross-section and being open at the top to enable feed to be returned downwardly into said channel, means for introducing feed into said channel, means comprising a chain disposed within said channel at the bottom thereof for moving said feed along said channel, a plurality of spaced apertures formed in the bottom of said channel for depositing feed into said trough from said channel in front of each cage of said row of cages, and means for vertically adjusting said channel on said rearward wall of said trough to control the height of the piles of feed built up in said trough beneath said channel apertures, said trough and said channel being so positionally related to each other and to said cages that said channel is disposed below the necks and inwardly of the heads of said poultry as they protrude their heads and necks through said cages to obtain feed from said trough.

9. A conveyor system for distributing feed to poultry housed within cages comprising a feed trough positioned adjacent the bottom and the front of a row of said cages, said trough having a vertically disposed rearward wall, a horizontally disposed channel secured to said rearward wall and extending therealong, said channel being substantially U-shaped in cross-section and being open at the top to enable feed to be returned downwardly into said channel, means for introducing feed into said channel, means comprising a chain disposed within said channel at the bottom thereof for moving said feed along said channel, a plurality of spaced apertures formed in said channel for depositing feed into said trough from said channel in front of each cage of said row of cages, and means for inhibiting direct access by said poultry to the feed within the channel while allowing feed within said trough to be thrown back into said conduit by said poultry, said trough and said channel being so positionally related to each other and to said cages that said channel is disposed below the necks and inwardly of the heads of said poultry as they protrude their heads and necks through said cages to obtain feed from said trough.

10. Apparatus for distributing feed to poultry in cages comprising a feed trough having oppositely disposed side walls, a feed distributor conduit supported adjacent one of said side walls and having at least one opening in the bottom thereof for distributing feed to the trough, said conduit being wide open at the top and having a height dimension equal to a plurality of times its width dimension, whereby feed may be returned downwardly into said conduit and feed disposed within said conduit is difficultly accessible to the poultry, a continuous chain and means to move the same through said conduit at the bottom thereof to convey feed therein, and at least one flexible member mounted to extend into said conduit to be thereby adapted to be disposed in yieldingly pressing relation to the feed whereby said feed is compressed above said chain to be moved thereby more efficiently and said chain is inhibited from riding upwardly within said conduit, said trough and said feed distributor conduit being so positionally related to each other and to said cages that said conduit is disposed below the necks and inwardly of the heads of said poultry as they protrude their heads and necks through said cages to obtain feed from said trough.

11. Apparatus for distributing feed to poultry in cages comprising a feed trough having a vertically disposed side wall disposed adjacent said cages, a feed distributor conduit disposed against said side wall of said trough, a continuous chain and means to move the same through said conduit at the bottom thereof to convey feed therein, an opening formed in said conduit along that side thereof which is oppositely disposed from said side wall of said trough, and baffle means extending angularly upwardly and outwardly from the bottom of said opening, said baffle means extending to a height which is materially less than the height of said conduit, said trough and said feed distributor conduit being so positionally related to each other and to said cages that said conduit is disposed below the necks and inwardly of the heads of said poultry as they protrude their heads and necks through said cages to obtain feed from said trough.

12. Apparatus for distributing feed to poultry in cages comprising a feed trough having a first vertically disposed side wall disposed adjacent said cages, a bottom wall, and a second upwardly and outwardly directed side wall, a relatively narrow feed distributor channel of generally U-shaped cross-section secured within said trough against said first side wall, spaced feed outlet apertures formed in said channel at the bottom thereof, said channel having an unobstructed open top enabling feed to be returned from said trough downwardly into said conduit, a flexible feed carrier disposed within said channel at the bottom thereof, and means for slidably moving said carrier within said channel, said trough and said channel being so positionally related to each other and to said cages that said channel is disposed below the necks and inwardly of the heads of said poultry as they protrude their heads and necks through said cages to obtain feed from said trough.

References Cited in the file of this patent

UNITED STATES PATENTS

| | | | |
|---|---|---|---|
| 1,394,799 | Thompson | Oct. 25, | 1921 |
| 1,896,615 | Gibbs | Feb. 7, | 1933 |
| 1,947,011 | Karthauser | Feb. 13, | 1934 |
| 2,302,314 | Haggart | Nov. 17, | 1942 |
| 2,591,609 | Roberts et al. | Apr. 1, | 1952 |
| 2,646,023 | Virgil | July 21, | 1953 |
| 2,715,887 | Flannery et al. | Aug. 23, | 1955 |
| 2,738,765 | Hart | Mar. 20, | 1956 |
| 2,738,766 | Hart | Mar. 20, | 1956 |
| 2,744,497 | Fisher et al. | May 8, | 1956 |
| 2,745,381 | Wallace et al. | May 15, | 1956 |
| 2,793,615 | Kerkvliet | May 28, | 1957 |
| 2,804,843 | Ison | Sept. 3, | 1957 |
| 2,827,877 | Hart | Mar. 25, | 1958 |
| 2,866,536 | Smallegan | Dec. 30, | 1958 |